R. B. LOCKE.
Track Clearer.

No. 233,359. Patented Oct. 19, 1880.

Attest:
Charles R. Searle
Arthur M. Pierce

Rich. B. Locke,
Inventor:
By Worth Osgood,
Attorney.

UNITED STATES PATENT OFFICE.

RICHARD B. LOCKE, OF BROOKLYN, NEW YORK.

TRACK-CLEARER.

SPECIFICATION forming part of Letters Patent No. 233,359, dated October 19, 1880.

Application filed January 29, 1880.

*To all whom it may concern:*

Be it known that I, RICHARD B. LOCKE, of Brooklyn, county of Kings, and State of New York, have invented certain new and useful Improvements in Safety Appliances for Railway-Trucks, which I have denominated "Improvements in Life-Guards and Track-Clearers," of which the following is a full, clear, and exact description, reference being had to the accompanying drawings, and to the letters of reference marked thereon, the same not having been to my knowledge heretofore patented in any foreign country.

My invention has relation more especially to that class of devices commonly used upon street-railway cars intended for the purpose of preventing any object upon the track from being run over by the wheels; but, as will be apparent from the following explanations, the improvements are alike applicable to all forms of trucks or wheels used in connection with railways of any character.

The purpose or object of my invention is to produce a simple, durable, cheap, compact, and effective device, easily applied and adjusted upon, or in connection with, a railway-car truck or other wheeled contrivance, which, when in place, will effectually prevent admission of any object between the track and wheel, and thus obviate damage to the object or derailment of the wheel, and preventing unsteadiness in the vehicle in consequence of keeping the track free of all obstructions. To accomplish this the invention consists in certain new and useful combinations or arrangements of parts and peculiarities of construction, all of which will be hereinafter first fully described, and then pointed out in the claims.

Figure 1:
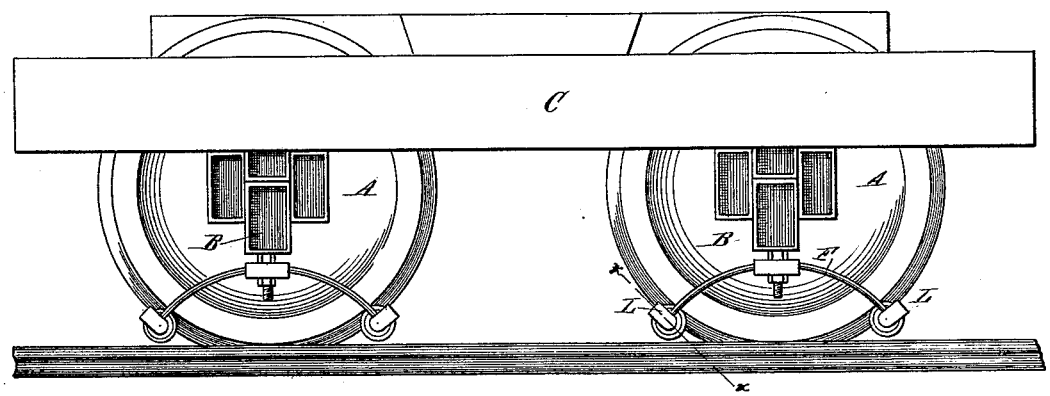
Figure 2:
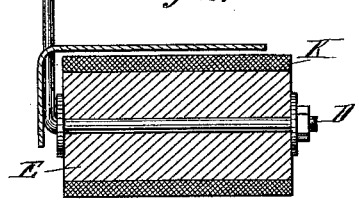
Figure 3:
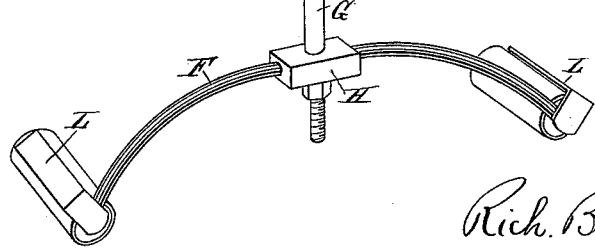

In the drawings, Figure 1 is an elevation or side view of an ordinary car-truck, illustrating my improved life-guard or track-clearer applied upon the front and rear of each wheel, and indicating the general arrangement thereof, which is in accordance with the principles of my invention. Fig. 2 is a sectional view of the improved device upon a plane passing through the line $x\ x$ of Fig. 1. Fig. 3 is a perspective view of a pair of the improved attachments, with their connecting frame or yoke detached from the truck in order to show clearly the most approved manner of connecting, supporting, and arranging them.

Like letters of reference, wherever they occur, indicate corresponding parts in all the figures.

A A are the car-wheels of any ordinary car-truck; B, the axle-box, and C the stringer upon which the bolster and car-body may be supposed to be supported. These parts are immaterial features of my invention, and may be of any approved or preferred pattern.

D is the axle, upon which my improved device is mounted and made to revolve. It is preferably made about as long as the tread of the wheel is broad, and is securely suspended at some convenient part of the truck, in such close proximity to the track and to the wheel as that when the revolving block is mounted thereon it (the block) shall bear against and receive motion from the wheel, while it shall clear the track by a distance not great enough to admit of any substantial object passing between it and the track.

Upon the axle D is mounted a wooden or metal block, E, and upon this block a removable or detachable covering, K, of rubber or other analogous yielding material. The block, being placed in contact with the surface of the wheel, and being made much smaller than said wheel, will, whenever the latter is revolved, turn upon its axle with a proportionately greater velocity, and the direction of its revolving motion will always be contrary to that of the car-wheel.

The bevel of the tread of the car-wheel is such that the small wheel or block will revolve in an inclined direction across the rail, the effect being to throw any object coming in contact therewith outside of the track in every case. Such being its construction and location, it is plain that whenever, during the advance of the car-wheel, the block or track-clearer comes in contact with any object, it will, by reason of the direction and velocity of its movement, tend to project such object away from in front of itself and from the wheel, and under no circumstances can it tend to draw anything in between it and the track, as is done in many forms of devices proposed for keeping the track clear.

The elastic covering not only insures greater certainty of motion being imparted to the appliance, but by reason of its yielding nature will do less damage to any object struck by it than if made of wood or metal—as, for instance, the hand, foot, or other part of the body being struck. One of the most important offices of this and other devices for similar purposes is to prevent the possibility of the wheel of the car running over any portion of a person, and it is likewise important that the person be not injured by contact with the track-clearer. This latter object is carefully attained by adopting the elastic or yielding covering in my improved device, but has been apparently overlooked in previous forms of these appliances.

That the track may be cleared when the truck runs in either direction, I propose to apply one of the improved clearers upon each side of each wheel, substantially as shown in the drawings.

If these two revolving blocks be sustained upon a yoke of proper breadth, as at F, a convenient point of attachment is found in the axle-box. From this I project a bolt, G, which is made to pass through the upper part of the yoke, and upon this bolt the yoke is adjustable up and down by means of the nut H, whereby any desired degree of pressure against the wheel may be attained.

This construction affords a simple and easy means of suspending the axles of the revolving blocks, and at the same time an effective arrangement for regulating the pressure thereof against the wheels.

It will be observed that the blocks bearing against the wheels are entirely independent of those upon the opposite wheels, or that their shafts are not joined, so that they have a free motion independently of each other; and it will also be observed that each revolving block occupies a space within the vertical tangent to the face of the car-wheel, and between it and the point of rest upon the track, so that there is no interference with the usual location and operation of the brake-shoe. This renders the improved device easily applicable to cars as now constructed, and without requiring any alterations of the attachments already in place.

Whenever any object is struck the revolving block is, of course, backed by the wheel with which it is in contact, and is in no danger of being itself damaged. Being guarded on the inner end by the flange of the wheel, it is not exposed to damage at that point, and whenever the wheel rides over a crossing track it is elevated with the wheel, so as not to strike the track.

In all situations and under all circumstances the improved appliance is found to admirably answer the several purposes and conditions, as previously stated.

For keeping the revolving block clear of snow and mud and the like matter, any simple form of guard or scraper, as at L, may be suspended thereabove, substantially as indicated.

Heretofore, in all forms of so-called "safety appliances" or "guards" placed in connection with the wheels of railway-vehicles, there has been no provision for preventing objects from wedging in between the track and the appliance itself, from which there frequently results quite as much damage as by contact with the wheels. This objection is entirely obviated in the construction herein pointed out.

I have indicated the simplest and best means known to me for suspending the axles of the revolving guards; but other means of suspension may be adopted without departing from the principles of my invention.

The invention is to be distinguished from that class of suspended auxiliary wheels which operate to prevent the main wheels from leaving the track and derive their motion from contact with the track itself. Such appliances would ride over an object rather than throw it out of the way.

Having now fully described my invention, what I claim as new, and desire to secure by Letters Patent, is—

1. In a revolving safety-guard of the character herein set forth, the combination, with the revolving block, of the elastic or yielding cover bearing against the face of the car-wheel, said block being adjustably suspended and adapted to operate in the manner and for the purpose set forth.

2. In combination with the axle-box of a car-wheel, an adjustable yoke carrying revolving blocks which bear against and receive their motion from contact with the wheel, said blocks being vertically adjustable with the yoke, being suspended slightly above the track on each side of the wheel, and adapted to operate substantially as and for the purposes set forth.

3. In combination with a revolving safety-guard receiving its motion from a car-wheel with which it is in contact, and being suspended slightly above the track, the scraper mounted thereabove and adapted to operate in connection therewith, substantially in the manner set forth.

4. In combination with the wheels of a car-truck, the herein-described independently-revolving safety-guards located upon each side of the truck within the angular space between the car-wheels and the track, and below the position of the brake-shoe, said revolving blocks being made adjustable, and constructed, mounted, and arranged to operate substantially as shown and described.

In testimony that I claim the foregoing I have hereunto set my hand in the presence of two witnesses.

RICH. B. LOCKE.

Witnesses:
CHAS. W. HELD, Jr.,
EDWARD M. SMITH.